(12) United States Patent
Iwabuchi

(10) Patent No.: US 6,456,966 B1
(45) Date of Patent: Sep. 24, 2002

(54) APPARATUS AND METHOD FOR DECODING AUDIO SIGNAL CODING IN A DSR SYSTEM HAVING MEMORY

(75) Inventor: Hiroshi Iwabuchi, Miyagi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/598,360

(22) Filed: Jun. 21, 2000

(30) Foreign Application Priority Data

Jun. 21, 1999 (JP) ............................................ 11-173759

(51) Int. Cl.[7] ........................ G10L 19/14; G10L 21/02; G10L 15/08
(52) U.S. Cl. ....................... 704/212; 704/201; 704/211; 704/236
(58) Field of Search .......................... 704/500, 214–217, 704/222–226, 258, 270–278; 369/44.24, 48

(56) References Cited

U.S. PATENT DOCUMENTS

| | | | |
|---|---|---|---|
| 5,765,127 A | * 6/1998 | Nishiguchi et al. | ......... 704/208 |
| 5,832,443 A | * 11/1998 | Kolesnik et al. | ............. 704/500 |
| 5,974,380 A | * 10/1999 | Smyth et al. | ................ 704/500 |
| 6,081,783 A | * 6/2000 | Divine et al. | ................ 704/500 |
| 6,134,202 A | * 10/2000 | Tsutsui | ......................... 369/48 |
| 6,154,499 A | * 11/2000 | Bhaskar et al. | .............. 704/200 |
| 6,246,645 B1 | * 6/2001 | Tsutsui | ..................... 369/44.24 |

OTHER PUBLICATIONS

Hwang et al ("Design of a Performance Enhanced Traceback Algorithm for the Viterbi Decoder," Electronics Letters, Jul. 4, 1996).*

* cited by examiner

*Primary Examiner*—Richemond Dorvil
*Assistant Examiner*—Daniel A Nolan
(74) *Attorney, Agent, or Firm*—Birch, Stewart, Kolasch & Birch, LLP (57) ABSTRACT

A deciding apparatus and method for deciding an audio signal coding system. A digital signal processor receives a coded audio signal, selects a specific coding system for the coded audio signal based on a predetermined portion of a data sequence of additional data of the audio signal, and decodes the audio signal using the selected coding system. A memory stores decoded programs for decoding the coded audio signal.

14 Claims, 9 Drawing Sheets

APPARATUS AND METHOD FOR DECODING AUDIO SIGNAL CODING IN A DSR SYSTEM HAVING MEMORY

BACKGROUND OF THE INVENTION

The present invention relates to a deciding apparatus for deciding an audio signal coding system and a deciding method using the same and, more particularly, a deciding apparatus for deciding an audio signal coding system using a DSP (Digital Signal Processor) and a deciding method using the same.

In recent years, the audio sources such as CD, LD, DVD, etc. have been spread and also PCM (Pulse Code Modulation), DTS, AC-3, MPEG, etc. have been practically used as the coding system for the audio signal recorded thereon. In order to decode the audio signals to which these coding systems are applied, the decoding methods that mate with the coding systems must be employed. Therefore, prior to the decoding of the audio signal, the coding system that has been applied to the audio signal must be decided.

The audio signal is input from the audio source (CD, LD, DVD, etc.) to the AV amplifier, the DVD player, the speaker system, etc. The audio signal from CD, LD, DVD is coded and the coding system is different for every audio source. The coding systems are shown in Table 1.

TABLE 1

| Audio source | Available Coding system |
| --- | --- |
| CD | PCM, DTS |
| LD | PCM, DTS, AC-3, MPEG |
| DVD | PCM, DTS, AC-3, MPEG |

In Table 1, DTS is the coding system developed by Digital Theater Systems, Inc., AC-3 is the coding system developed by Dolby Research Institute, and MPEG (Moving Picture Experts Group) is the international standard of the information compressed coding system.

As can seen from Table 1, only a single coding system is not always applied to one audio source, but a plurality of coding systems may be applied to one audio source in some cases. In this case, the coding system may be changed in the middle of listening of one audio source. For example, there is such a case that, since DTS, AC-3, or MPEG can be applied to the DVD, first the audio source coded by DTS is listened and then switched to the same audio source coded by AC-3 or MPEG in the middle.

Therefore, in order to decode the audio signal, first it must be decided which coding system is applied to the audio signal at present. Then, the audio signal must be decoded according to the decoding method that corresponds to the decided coding system.

In the following, the deciding apparatus for deciding audio signal coding system employed in the prior art will be explained with reference to FIG. 1 hereunder.

Figure 1:
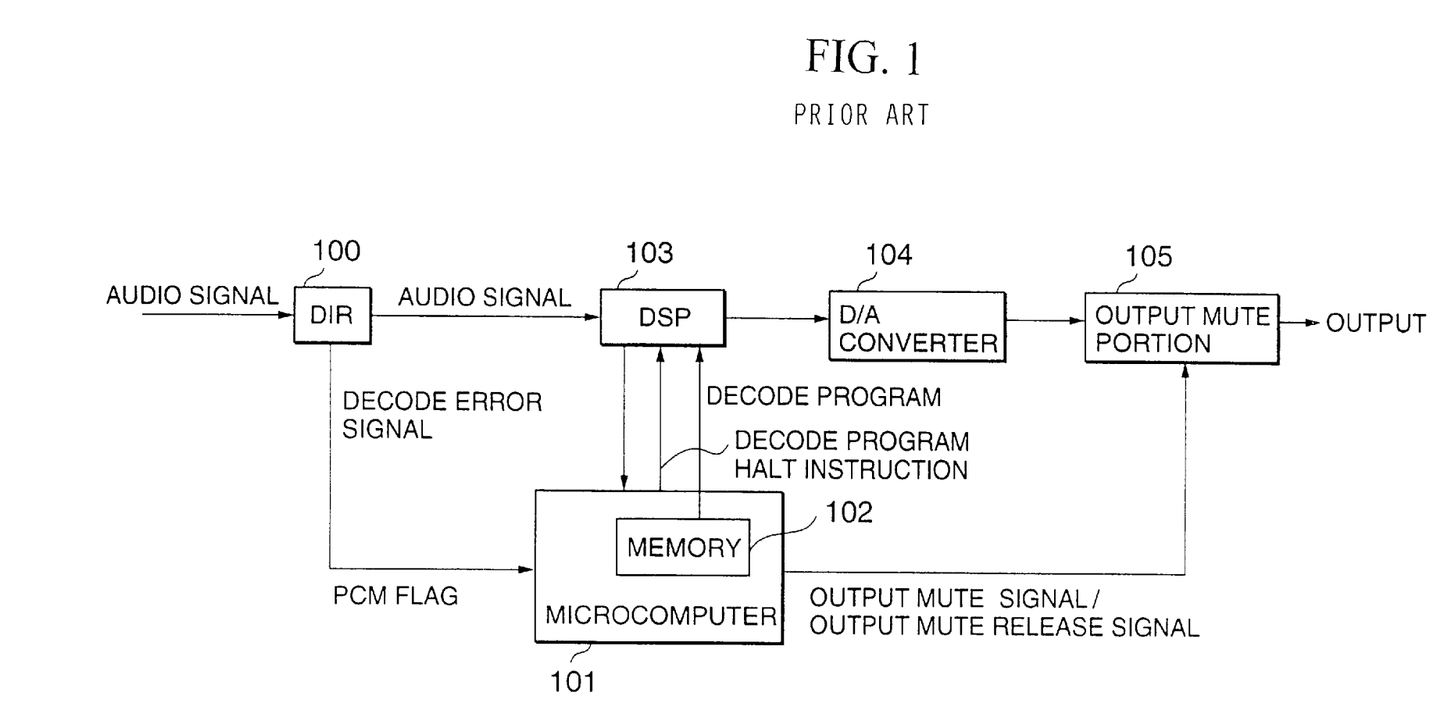
FIG. 1 is a block diagram showing a deciding apparatus for deciding audio signal coding system in the prior art.

FIG. 1 is a block diagram showing a deciding apparatus for deciding audio signal coding system in the prior art. In FIG. 1, 100 denotes a DIR (Digital Interface Receiver). The audio signal supplied from the audio source is converted into a predetermined signal format by the DIR 100, and then input into a DSP (Digital Signal Processor) 103.

The audio signal from the audio source is based on the digital audio interface standard called IEC958, and one frame of the audio signal consists of audio data and additional data. An information indicating that the audio signal is coded by either the PCM or a coding system (DTS, AC-3, or MPEG) other than the PCM is contained in the additional data.

If the audio signal is coded by the PCM, the DIR 100 turns ON a flag indicating this (referred to as a "PCM flag" hereinafter) based on this information, and then outputs the PCM flag to a microcomputer 101. Also, if the audio signal is coded by a coding system other than the PCM, the DIR 100 turns OFF the PCM flag, and then outputs the PCM flag to the microcomputer 101. Based on ON/OFF of the PCM flag, the microcomputer 101 can decide whether the present audio signal input is coded by a PCM or the coding system (DTS, AC-3, or MPEG) other than the PCM. However, if the audio signal is coded by a coding system other than the PCM, it cannot be decided only by the PCM flag which one of DTS, AC-3, and MPEG is used for the audio signal. A method of identifying DTS, AC-3, and MPEG in this case will be described later.

The DSP 103 decodes the audio signal input from the DIR 100. In order to decode the audio signal, the decode program which corresponds to the coding system applied to the audio signal must be previously loaded onto the DSP 103. The decode program necessary for the decoding is stored in a memory 102 in the microcomputer 101, and the program is loaded onto the DSP 103 according to the coding system applied to the audio signal.

Also, if the decode program which does not mate with the coding system applied to the audio signal is loaded onto the DSP 103, such DSP 103 has a function for outputting the decode error signal to the microcomputer 101. For example, since the coding system does not coincide with the decode program which is being loaded in case the coding system of the audio signal is changed in the middle of listening to the certain audio source, the DSP 103 outputs the decode error signal to the microcomputer 101. Accordingly, the microcomputer 101 can detect that the coding system of the audio signal has been changed.

Reference numeral 105 denotes an output mute device for muting the output from the DSP, and 104 denotes a D/A converter for converting the digital signal output from the DSP into the analog signal.

Next, a deciding method for deciding audio signal coding system using the deciding apparatus for deciding the audio signal coding system shown in FIG. 1 will be explained with reference to FIG. 2.

Figure 2:
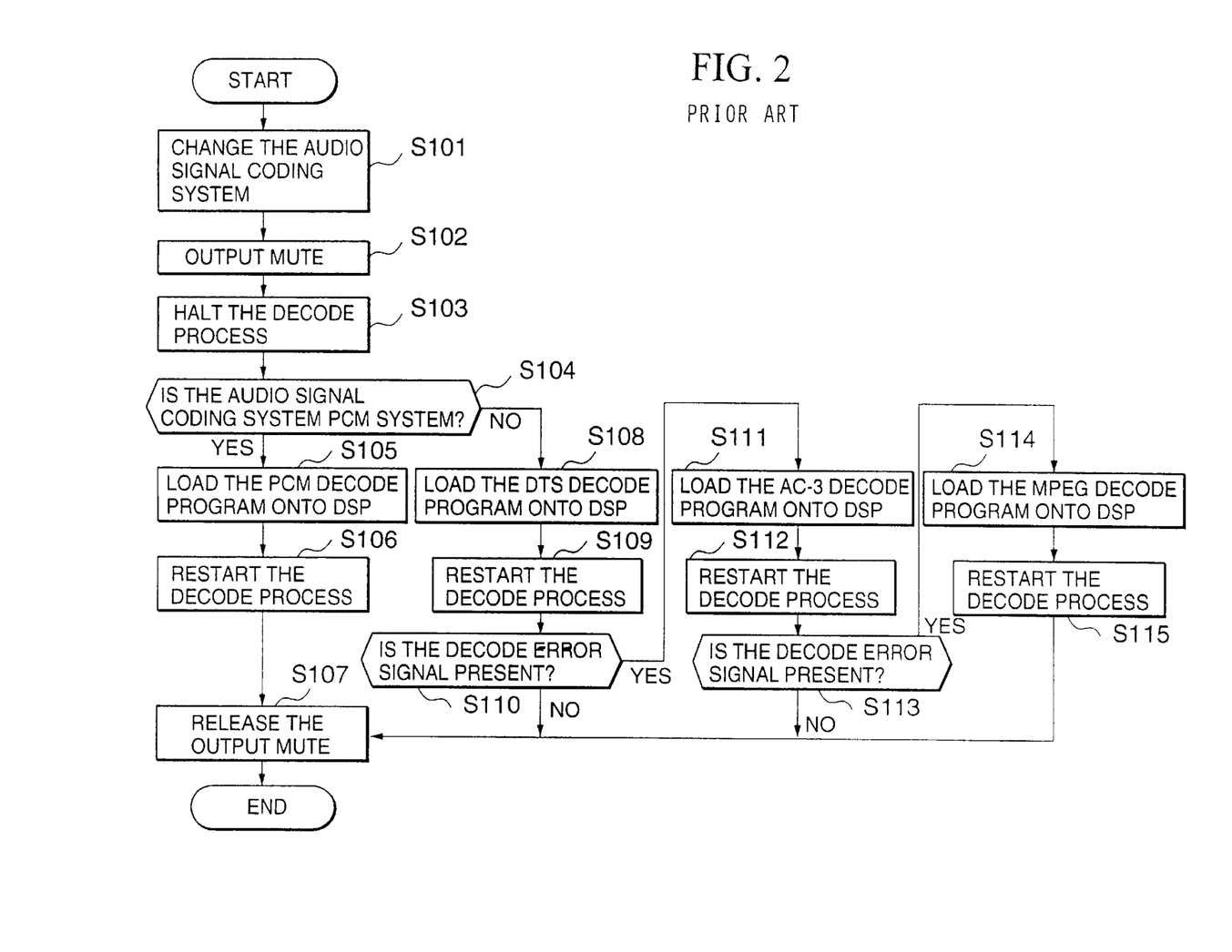
FIG. 2 is a flowchart showing a deciding method for deciding audio signal coding system in the prior art.

FIG. 2 is a flowchart showing a process for deciding audio signal coding system programmed in the microcomputer 101 in the prior art.

First of all, in step S101, according to the ON/OFF-switching of the PCM flag being output from the DIR 100 or the decode error signal, the microcomputer 101 detects that the coding system of the audio signal from the audio source has been changed.

Then, in step S102, the microcomputer 101 outputs the output mute signal to the output mute device 104 to mute the output.

In turn, in step S103, the microcomputer 101 outputs the decode program halt instruction to the DSP 103 to halt the current decode process being executed in the DSP 103.

Then, in step S104, it is decided whether or not the coding system of the audio signal supplied from the audio source is either the PCM system or another system (DTS, AC-3, or MPEG). This decision is made based on ON/OFF of the PCM flag from the DIR 100. In other words, the microcomputer 101 decides that the coding system is the PCM system if the PCM flag is ON, while it decides that the coding system is another system (DTS, AC3, or MPEG) if the PCM flag is OFF.

At this time, in step S104, if it is decided that the coding system of the audio signal from the audio source is the PCM system (if YES), the process goes to step S105. Then, the PCM decode program stored in the memory 102 is loaded onto the DSP 103. Then, the process goes to step S106, and the decode process start signal is output to the DSP 103 and the decode process is restarted in the DSP 103. After this, the process advances to step S107, and then the microcomputer 101 outputs the output mute release signal to the output mute device 104 to release the output mute, whereby the process for deciding audio signal coding system is ended.

In contrast, in step S104, if it is decided that the coding system of the audio signal from the audio source is not the PCM system (if NO), the process goes from step S104 to step S108. Then, in step S108, the DTS decode program is loaded from the memory 102 onto DSP 103. Then, the process advances to step S109, where the microcomputer 101 outputs the decode process start signal to the DSP 103 to cause the DSP 103 to restart the decode process. Then, the process goes to step S110, where the microcomputer 101 decides whether or not the decode error signal supplied from the DSP 103 is present. Such decode error signal is output from the DSP 103 to the microcomputer 101 when the coding system applied to the audio signal currently does not coincide with the decode program loaded onto the DSP 103. For this reason, in step S110, if there is no decode error signal (if NO), it can be understood that the coding system applied currently to the audio signal is DTS. In this case, there is no need to load another decode program (for AC-3 or MPEG) onto the DSP 103, and thus the process goes to step S107. The output mute is released in step S107 and then the decision process of the coding system is ended.

In contrast, in step S110, if there is the decode error signal (if YES), the process is proceeded from step S110 to step S111. In step S111, the AC-3 decode program is loaded from the memory 102 onto DSP 103. Then, the process goes to step S112, and then the microcomputer 101 outputs the decode process start signal to the DSP 103 to restart the decode process in the DSP 103. Then, the process goes to step S113, and then the microcomputer 101 decides whether or not the decode error signal supplied from the DSP 103 is present. At this time, in step S113, if there is no decode error signal (if NO), it can be understood that the coding system applied currently to the audio signal is AC-3. In this case, there is no need to load another decode program (for MPEG) onto the DSP 103, and thus the process goes to step S107. The output mute is released in step S107 and then the decision process of the coding system is ended.

In step S113, if there is the decode error signal (if YES), the process is shifted from step S113 to step S114. In step S114, the MPEG decode program is loaded from the memory 102 onto DSP 103. Then, the process goes to step S115, where the microcomputer 101 outputs the decode process start signal to the DSP 103 to restart the decode process in the DSP 103. At this time, since the coding systems (PCM, DTS, or AC-3) other than the MPEG have already been decided in step S104, S110, S113, there is no coding system except the MPEG as the coding system which is applied currently to the audio signal. Accordingly, since there is no necessity to decide whether or not the decode error signal is present after step S115, the process goes to step S107. Then, the output mute is released in step S107 and then the process for deciding audio signal coding system is ended.

According to the above deciding apparatus for deciding audio signal coding system and the deciding method using the same in the prior art, it is decided based on the PCM flag from the DIR 100 whether or not the coding system is either the PCM or remaining systems (DTS, AC-3, or MPEG), then the decode program for the system (DTS, AC-3, or MPEG) other than the PCM is loaded from the memory 102 to the DSP 103 if it is decided that the coding system corresponds to the system other than the PCM, and then the coding system is decided based on whether or not the decode error signal supplied from the DSP 103 is present.

However, the above deciding apparatus for deciding audio signal coding system and the deciding method using the same have the following problems.

That is, when the coding system (DTS, AC-3, or MPEG) other than the PCM is applied to the audio signal, the PCM flag supplied from the DIR 100 does not provide to the microcomputer 101 information indicating which coding system of DTS, AC-3, or MPEG is employed. In order to identify DTS, AC-3, or MPEG, the microcomputer 101 must load the decode programs corresponding to these coding systems from the memory 102 to the DSP 103 several times.

Since the communication rate between the microcomputer 101 and the DSP 103 is about 200 kbps at the utmost, it takes too much time to load the large decode program onto the DSP 103 at this communication rate. In the case where the longest time is required, it takes about 500 msec to load one decode program. Thus, if the process goes up to step S114 in FIG.2 (i.e., the decode programs of DTS, AC-3, or MPEG are loaded sequentially), a time of about 1.5 sec (=3×500 msec) is required.

The microcomputer 101 must execute processes such as the display, the remote control, panel control, etc. in addition to the decision of the audio signal coding system. Because these jobs are temporarily held during the decision process of the coding system, the decision process of the coding system interferes with these jobs if too much time is required for such decision process of the coding system.

SUMMARY OF THE INVENTION

It is an object of the present invention to provide a deciding apparatus for deciding audio signal coding system capable of deciding the coding system of the audio signal in a shorter time than the prior art, and a deciding method for deciding audio signal coding system using the same system.

According to the deciding apparatus for deciding audio signal coding system described in the present invention, the apparatus comprises a DSP (Digital Signal Processor) for deciding audio signal coding system and decoding the audio signal, a storing means for storing decode programs necessary for the decoding of the audio signal by the DSP, and an output muting means for muting the output from the DSP. It is the DSP that executes the decision of the coding system of the audio signal, and thus the microcomputer is not employed to decide the coding system, unlike in the prior art.

Therefore, the DSP is not requested to communicate with the microcomputer. As a result, the time necessary for such communication is eliminated and thus the time consumed to decide the coding system is reduced.

Also, according to the deciding method for deciding audio signal coding system described in the present invention, the coding system is decided based on the data sequence in the predetermined portion of the additional data in the audio signal.

Therefore, the time consumed to decide the coding system is reduced compared with the conventional deciding method in which the decode program must be loaded into the DSP several times.

DESCRIPTION OF THE PREFERRED EMBODIMENTS (1) Explanation of a deciding apparatus for deciding audio signal coding system according to a first embodiment of the present invention.

Figure 3:
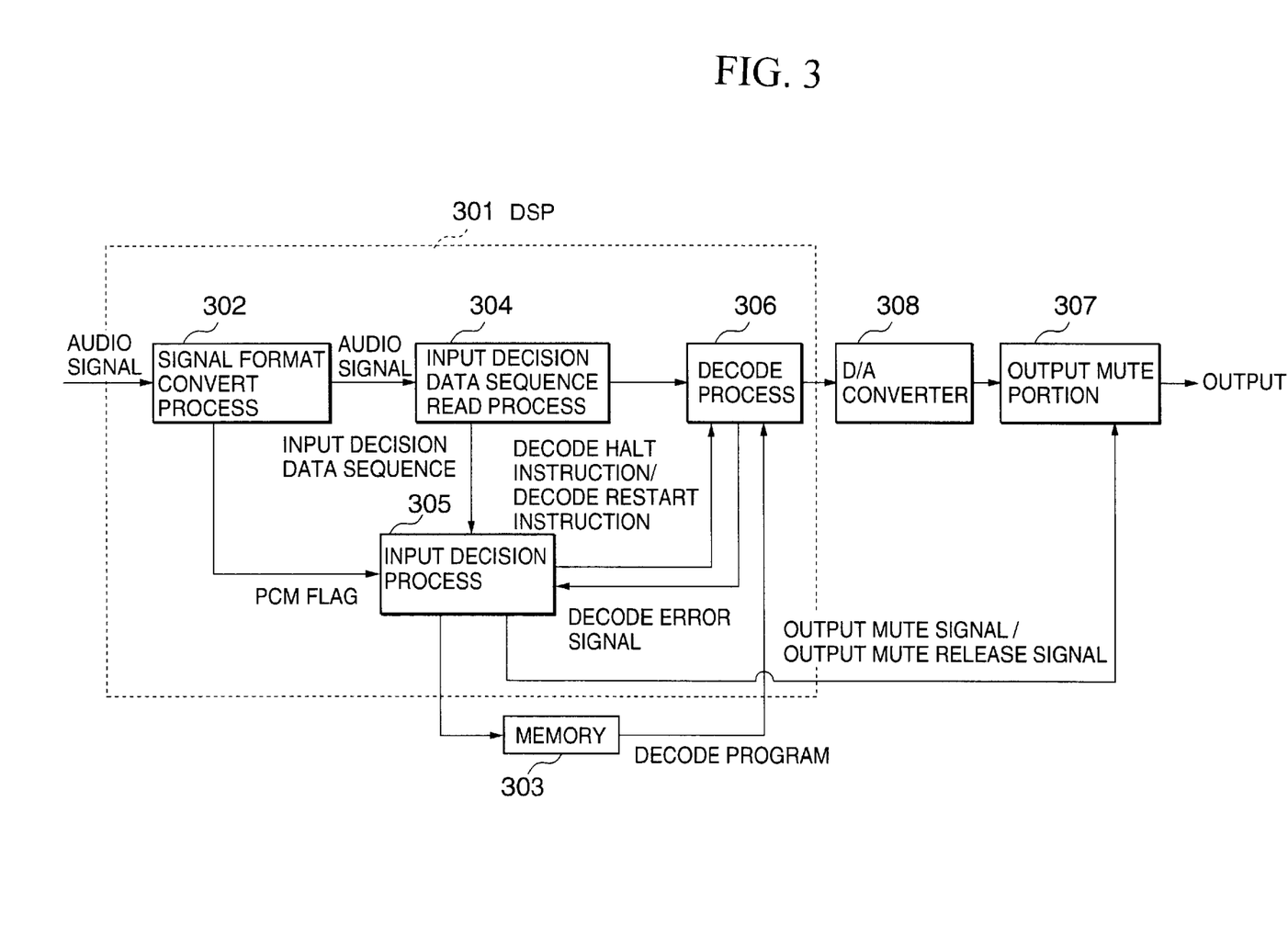
FIG. 3 is a block diagram showing a deciding apparatus for deciding audio signal coding system according to a first embodiment of the present invention.

FIG. 3 is a functional block diagram showing the deciding apparatus for deciding an audio signal coding system according to the first embodiment of the present invention. As shown in FIG. 3, the apparatus comprises a DSP (Digital Signal Processor) 301, a memory 303 as an embodiment of a storing means, a D/A converter 308, and an output mute portion 307 as an embodiment of an output muting means. As can be seen from the Figure, the microcomputer being utilized in the prior art is not employed in the present invention. These functions will be explained in the following.

The decode programs which correspond to PCM, DTS, AC-3, and MPEG respectively are stored in the memory 303. If the decoding is performed by the DSP 301, the decode program which mates with the coding system of the currently input audio signal is loaded onto the DSP 301.

The D/A converter 308 converts the audio signal that has been decoded by the DSP 301 into an analog signal and then outputs the analog signal to an external speaker or a headphone (not shown). The output mute portion 307 mutes temporarily output of the decoded audio signal when the coding system of the audio signal is changed.

The audio signal is input from the audio source (not shown) to the DSP 301. This DSP 301 executes a signal format convert process 302, an input decision data sequence read process 304, an input decision process 305, and a decode process 306.

Here, these processes executed in the DSP 301 will be explained hereunder.

The process contents in the signal format convert process 302 are similar to those in the DIR 100 in the prior art. That is, when the audio signal formatted based on IEC958 standard is input from the audio source (not shown), the signal format convert process 302 converts the audio signal into a predetermined signal format and is then output it to the decode process 306. Also, based on the information contained in the additional data in the input audio signal, the signal format convert process 302 decides whether or not the audio signal is coded by either the PCM coding system or other coding system (DTS, AC-3, or MPEG) other than the PCM coding system. Then, if the audio signal is coded by the PCM coding system, the signal format convert process 302 turns ON the PCM flag and then outputs such PCM flag into the input decision process 305. Meanwhile, if the audio signal is coded by the coding system (DTS, AC-3, or MPEG) other than the PCM coding system, the signal format convert process 302 turns OFF the PCM flag and then outputs the PCM flag into the input decision process 305. In this case, if there is no input of the audio signal, the PCM flag becomes an error.

The input decision data sequence read process 304 reads a predetermined portion of a data sequence in the additional data of the audio signal, which is input from the signal format convert process 302 (referred to as an "input decision data sequence" hereinafter), and then outputs the input decision data sequence into the input decision process 305. In addition to this, the audio signal is input from the input decision data sequence read process 304 to the decode process 306.

The input decision process 305 decides the coding system of the currently input audio signal, based on the PCM flag input from the signal format convert process 302 and the input decision data sequence input from the input decision data sequence read process 304. As mentioned above, if the audio signal has not been coded by the PCM coding system, the PCM flag does not contain the information indicating which coding system (DTS, AC-3, or MPEG) except the PCM has been applied to the audio signal.

In the present invention, if the audio signal has not been coded by the PCM coding system, the input decision process 305 decides the coding system based on the input decision data sequence. Since the input decision data sequence is different according to the coding system of the audio signal, the coding system of the current audio signal can be decided by investigating the input decision data sequences for each of the coding systems (DTS, AC-3, and MPEG) in the designing step of the apparatus and then comparing the input decision data sequence with that of the current audio signal. According to this, unlike the prior art, there is no necessity that the decode programs corresponding to respective coding systems (DTS, AC-3, and MPEG) should be loaded onto the DSP several times, and thus a time necessary for the loading can be omitted. Therefore, the time required for the decision of the coding system can be reduced shorter than the prior art.

If the audio signal is coded by the PCM coding system, the PCM flag that has been turned ON is input from the DIR process 302 to the input decision process 305. Accordingly, the input decision process 305 can decide that the current audio signal is coded by the PCM.

When the coding system of the audio signal is decided in this manner, the decode program which corresponds to the current coding system is loaded onto the DSP 301 from the memory 303. In the decode process 306, the audio signal is decoded by the decode program. Then, the decoded audio signal is output from the decode process 306 to the output mute portion 307.

Here, the communication rate between the memory 303 and the DSP 301 is about 40 Mbps. This value is quicker than the communication rate that is employed by the microcomputer in the prior art, i.e., the communication rate of 200 kbps between the microcomputer and the DSP. As a result, the time required for the loading of the decode program from the memory 303 to the DSP 301 can be reduced shorter than 500 msec (the time which is needed to load one decode program onto the DSP 103 from the memory 102 in the microcomputer 101) in the prior art.

Then, if the coding system of the currently input audio signal is changed, the coding system does not coincide with the loaded decode program and thus the audio signal cannot be decoded. For example, in case the audio signal for the DTS is being decoded by the decode program for the DTS, it is impossible for the decode program for the DTS to decode the AC-3 after the audio signal is switched to the AC-3.

In such a case, the decode process 306 outputs the decode error signal to the input decision process 305. An operation of the input decision process 305 performed when it receives the decode error signal will be explained in: "(2) Explanation of a deciding apparatus for deciding audio signal coding system according to a second embodiment of the present invention" hereunder.

As described above, in the deciding apparatus for deciding audio signal coding system according to the first embodiment of the present invention, if the employed coding system except the PCM must be decided when the audio signal is not coded by the PCM coding system, the input decision process 305 decides the coding system based on the input decision data sequence in the additional data of the audio signal. According to this system, unlike the prior art, since there is no necessity that the decode program should be loaded onto the DSP several times, the time required for the decision of the coding system can be reduced shorter than the prior art.

Also, even in the case that the decode program which corresponds to the coding system is loaded after the coding system has been decided in this manner, the time required for the loading can be reduced shorter than the prior art. That is, in the present invention, because the DSP does not communicate with the microcomputer like the prior art but directly communicates with the memory, the communication rate can be accelerated quicker than the prior art and thus the time required for the decision of the coding system can also be reduced shorter than the prior art.

It should be noted that, if a programmable CPU is employed in place of the DSP in the first embodiment, the same advantages as the first embodiment can be achieved.

(2) Explanation of a deciding apparatus for deciding audio signal coding system according to a second embodiment of the present invention.

The deciding method for deciding audio signal coding system according to the second embodiment of the present invention will be explained with reference to FIG. 3 and FIG. 4.

Figure 4:
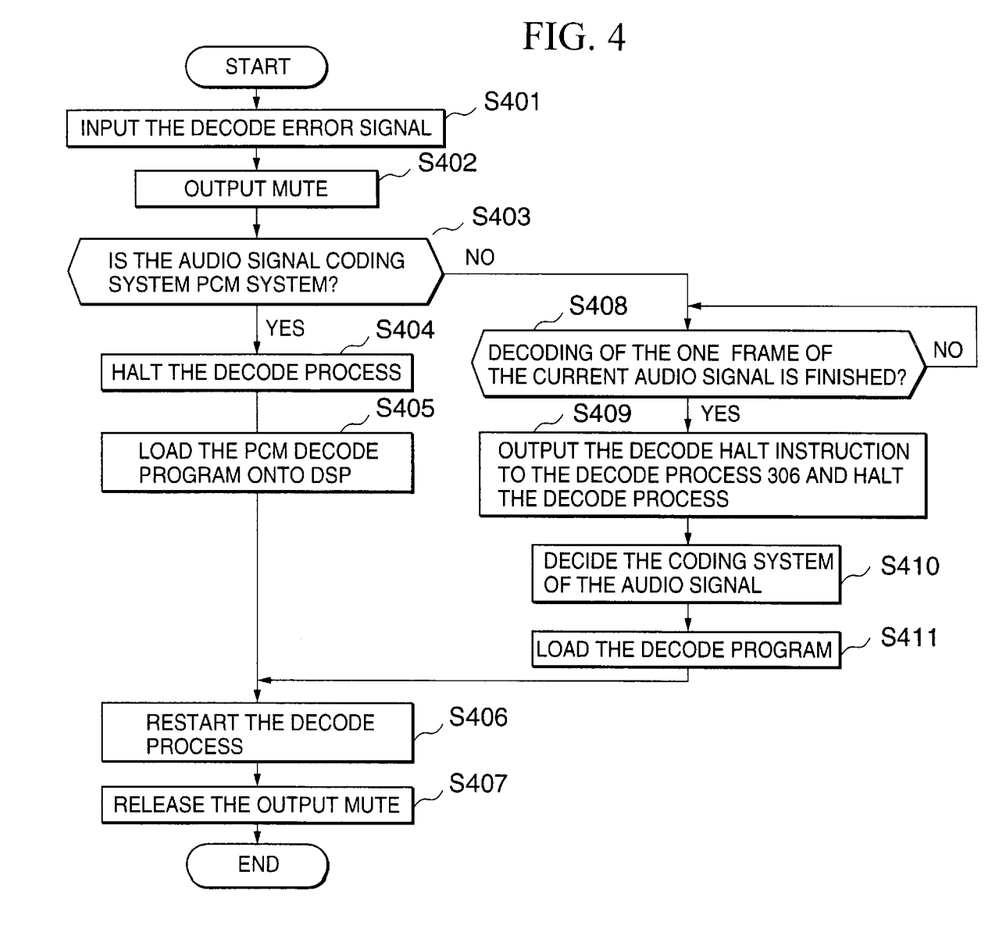
FIG. 4 is a flowchart showing a deciding method for deciding audio signal coding system according to a second embodiment of the present invention.

FIG. 4 is a flowchart showing the deciding method for deciding audio signal coding system according to the second embodiment. This shows procedures of the input decision process 305 shown in FIG. 3.

First, the coding system of the audio signal which is currently input into the apparatus is changed and thus the decode error signal is input from the decode process 306 to the input decision process 305 (step S401). Then, the input decision process 305 outputs the output mute signal to the output mute portion 307 (step S402).

Then, the input decision process 305 goes to step S403 to decide whether or not the audio signal coding system is either the PCM or the remaining (DTS, AC-3, or MPEG). This decision is made based on the PCM flag that is input from the signal format convert process to the input decision process 305. That is, it is decided that the coding system is the PCM if the PCM flag is ON, while it is decided that the coding system is the remaining (DTS, AC-3, or MPEG) other than the PCM if the PCM flag is OFF.

If it is decided that the coding system of the currently input audio signal is the PCM (if YES), the process goes to step S404 to output the decode halt instruction to the decode process 306. Accordingly, the decode process 306 is interrupted and thus the decode process which is being executed currently in the decode process 306 caused to stop.

Then, the process goes to step S405 to load the PCM decode program stored in the memory 303 onto the DSP. After the loading has been finished, the process goes to step S406 to output the decode restart instruction to the decode process 306. Accordingly, in the decode process 306, the audio signal decode process is restarted based on the newly loaded decode program for the PCM. Then, the process goes to step S407 to output the output mute release signal to the output mute portion 307. Therefore, the audio signal which is decoded in the decode process 306 and converted into the analog signal in the D/A converter 308 is output to an external speaker or a headphone (not shown).

In step S403, if it is decided that the coding system of the currently input audio signal is not the PCM (if NO), the process goes to step S408. In step S408, it is checked whether or not the decode process of one frame of the current audio signal is finished in the decode process 306. Here, if the decode process of one frame is finished, the process goes to step S409. If the decode process of one frame is not currently finished, step S408 is repeated until the decode process of one frame is finished, and the process goes to step S409 after the decode process of one frame has been finished. In this case, the time consumed until the decode process of one frame has been finished is about 32 msec by the AC-3 and about 24 msec by the MPEG (Layer 2).

In step S409, the decode halt instruction is output to the decode process 306. Thus, the decode process is interrupted and then the decode process which is being executed currently in the decode process 306 is halted.

Then, the process goes to step S410 to decide the coding system of the currently input audio signal. This decision is made based on the input decision data sequence which is input from the input decision data sequence read process 304 to the input decision process 305. As mentioned above, since the input decision data sequence is different according to the coding system (DTS, AC-3, or MPEG) respectively, the coding system of the current audio signal can be decided by previously investigating the input decision data sequences for each coding systems (DTS, AC-3, or MPEG) in the designing step of the apparatus and then comparing the input decision data sequence with that of the current audio signal.

When the coding system of the audio signal is decided in step S410, the process goes to step S411. In step S411, the decode program which corresponds to the decided coding system is loaded from the memory 303 to the DSP 301. At this time, unlike the prior art, since the microcomputer is not employed in the present invention, the time necessary for the loading can be reduced shorter than the prior art. More particularly, as described above, in the prior art using the microcomputer, the communication rate between the microcomputer and the DSP is about 200 kbps at its maximum. Thus, it takes about 500 msec to load one decode program from the memory in the microcomputer to the DSP at this rate. In contrast, in the present invention, the DSP 301 directly communicates with the memory 303 at the communication rate of about 40 Mbps. This rate is higher than the communication rate (200 kbps) between the microcomputer and the DSP in the prior art. As a result, the time required for the loading of one decode program can be reduced shorter than the prior art (500 msec).

If the loading of the decode program has been finished in this manner, the process goes to step S406 to output the decode restart instruction to the decode process 306. Thus, in the decode process 306, the decode process of the audio signal is restarted based on the newly loaded decode program. Then, the process goes to step S407 to output the output mute release signal to the output mute portion. Therefore, the audio signal which is decoded in the decode process 306 and converted into the analog signal in the D/A converter 308 is output to an external speaker or a headphone (not shown).

As described above, in the deciding method for deciding audio signal coding system according to the second embodiment of the present invention, if the audio signal is not coded by the PCM coding system and thus another coding system except the PCM must be decided (step S410), the decode program should not be loaded onto the DSP several times, unlike the prior art. In the present invention, if the audio signal is coded by another coding systems except the PCM coding system, the time needed to decide the coding system and then load the decode program corresponding to the coding system onto the DSP is given as a total sum of respective process times in step S408 to step S411. As described above, the time necessary for the process in step S408 is about 24 to 32 msec, the time necessary for the loading of the decode program in step S411 is less than 500 msec, and S409 (decode halt) and S410 (input decision) can be processed in an instant. Accordingly, a total sum of these process times (steps S408 to S411) becomes apparently shorter than the process time (1.5 sec in maximum) in the prior art.

(3) Explanation of a deciding method for deciding audio signal coding system according to a third embodiment of the present invention.

The deciding method for deciding audio signal coding system according to the third embodiment of the present invention will be explained with reference to FIG. 5 hereunder.

Figure 5:
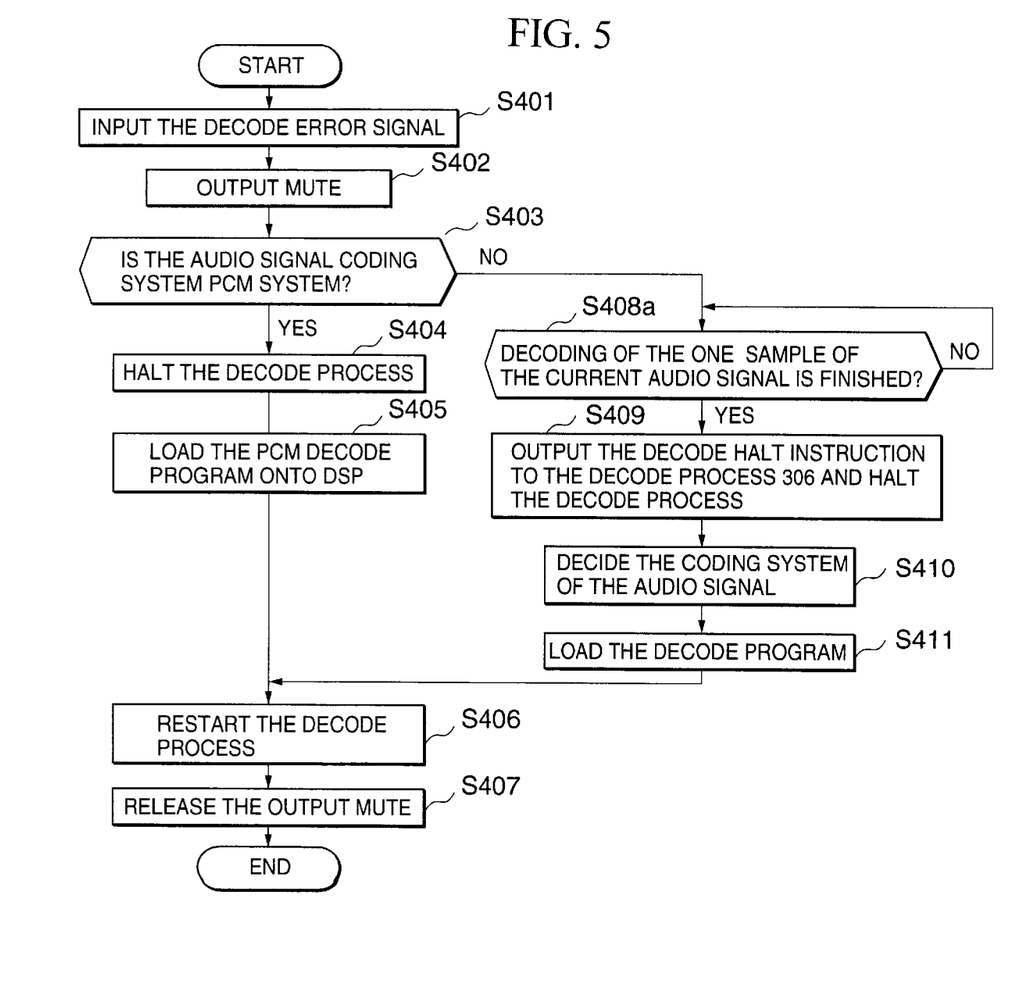
FIG. 5 is a flowchart showing an deciding method for deciding audio signal coding system according to a third embodiment of the present invention.

FIG. 5 is a flowchart showing the deciding method for deciding audio signal coding system according to the third embodiment. This shows procedures in the input decision process 305 in FIG. 3. Also, in FIG. 5, the same symbols as in FIG. 4 are affixed to similar steps to FIG. 4.

A difference of the third embodiment from the second embodiment resides in that, in the third embodiment, step S408a is employed in place of step S408 in the second embodiment. Since process contents in remaining steps are the same as those in the second embodiment, explanation of these steps will be omitted.

In step S408 in the second embodiment, it is checked whether or not the decode process of one frame of the current audio signal has been finished in the decode process 306.

In contrast, in step S408a in the third embodiment, it is checked whether or not the audio signal of one sample has been input into the decode process 306 at present. Since normally the audio signal is input into the apparatus via multiple channels (2-ch, 5.1-ch, 7.1-ch), the signal is input into the apparatus in a shorter period than the sampling interval of a single channel. For example, if one considers the case where two-channel inputs are present in a CD, the signal is input at the interval of about $1.2 \times 10^{-2}$ ($\approx 2.3 \times 10^{-2}/2$) msec into the apparatus since the sampling interval of one channel is about $2.3 \times 10^{-2}$ msec in the CD.

Accordingly, while the time required for completing the step S408 is the time necessary for decoding one frame (24~32 msec) in the second embodiment, the time required for completing the step S408a in the third embodiment is shorter than the sampling interval ($1.2 \times 10^{-2}$ msec in the above example). Thus, the process time in step S408a can be reduced shorter than step S408 in the second embodiment. As a result, the time required to decide the coding system of the audio signal which is input into the apparatus can be reduced further shorter than the second embodiment.

(4) Explanation of a deciding apparatus for deciding audio signal coding system according to a fourth embodiment of the present invention.

Figure 6:
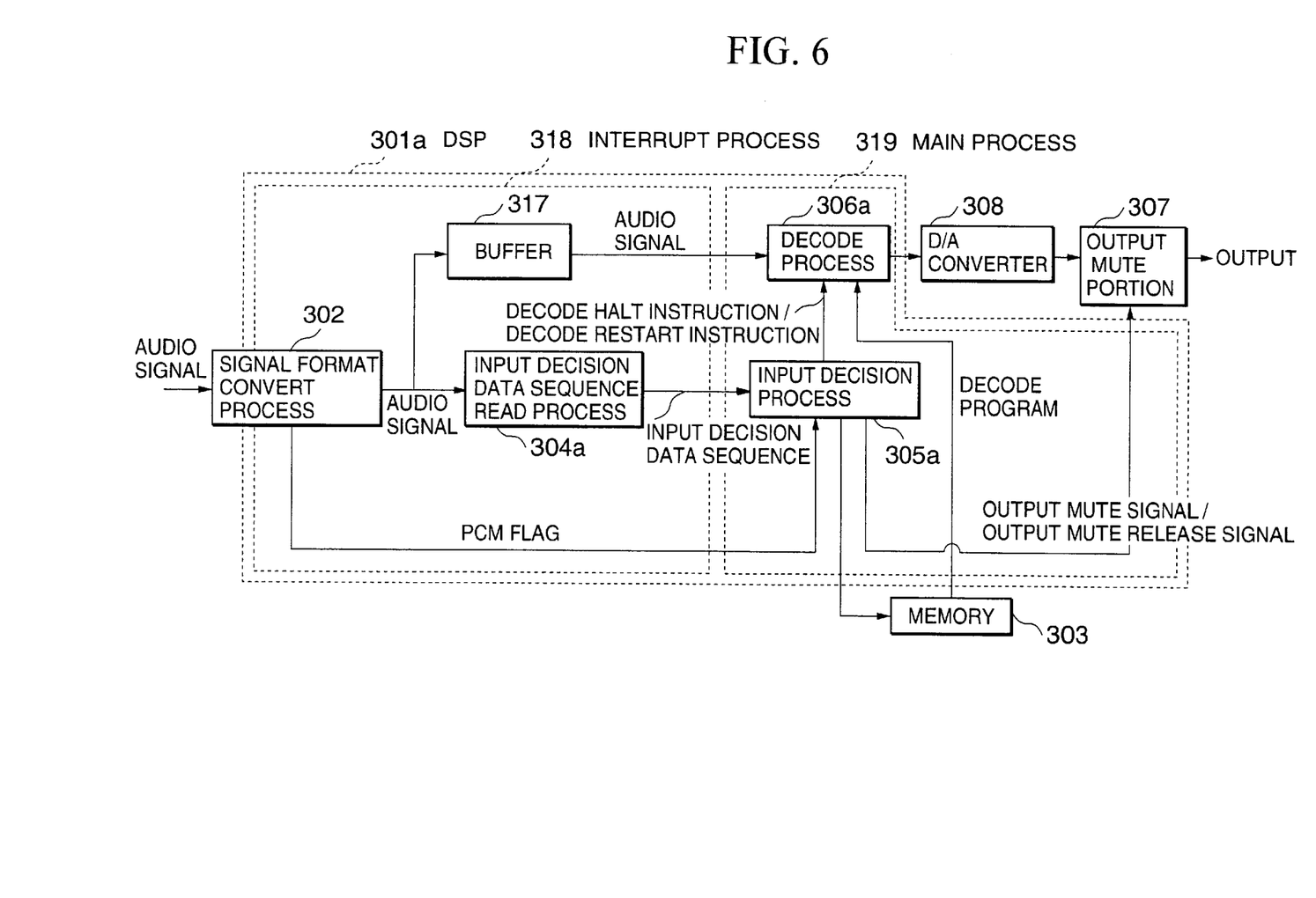
FIG. 6 is a block diagram showing a deciding apparatus for deciding audio signal coding system according to a fourth embodiment of the present invention.

FIG. 6 is a functional block diagram showing the deciding apparatus for deciding audio signal coding system according to the fourth embodiment of the present invention. In FIG. 6, the same symbols are affixed to the same constituent elements in above FIG. 3, and their explanation will be omitted in the following.

As shown in FIG. 6, this system comprises a DSP (Digital Signal Processor) 301a, the memory 303 as an embodiment of the storing means, the D/A converter 308, and the output mute portion 307 as an embodiment of the output muting means. As can be seen from this, the microcomputer that has been employed in the prior art is not employed in the present invention. These functions will be explained in the following.

The DSP 301a applies an interrupt process 318 that performs the input decision data sequence read process, etc., and a main process 319 that performs the decode process, etc, to the audio signal that is input from the audio source (not shown), according to a time-division system.

First, when the audio signal is input into the DSP 301a from the audio source (not shown), such audio signal is input into the signal format convert process 302 in the interrupt process 318.

The signal format convert process 302 converts the input audio signal into a predetermined signal format, and then outputs the signal to the buffer 317 and to an input decision data sequence read process 304a. In addition to this, the signal format convert process 302 outputs the PCM flag to an input decision process 305a in the main process 319.

Here, the buffer 317 stores temporarily the audio signal which has been converted into the predetermined signal format. Then, the input decision data sequence read process 304a reads data sequence of a predetermined portion in the additional data of the audio signal which is input from the signal format convert process 302 (referred to as an "input decision data sequence" hereinafter), and then outputs the input decision data sequence to the input decision process 305a.

When these processes are completed, the interrupt process 318 is finished and then the main process 319 is started.

The main process 319 executes a decode process 306a and the input decision process 305a. In the input decision process 305a, based on the PCM flag being output from the interrupt process 318 on and the input decision data sequence, the coding system of the audio signal that is being input currently into the apparatus is decided. The decision of the coding system performed at this time is carried out in the same way as mentioned previously in the first embodiment.

That is, if the PCM flag is ON, it is decided that the audio signal is coded by the PCM. Then, if the PCM flag is OFF, it is decided that the audio signal is coded by the coding system (DTS, AC-3, or MPEG) other than the PCM. The decision to check which coding system (DTS, AC-3, or MPEG) is applied to the audio signal is performed based on the input decision data sequence.

If the coding system of the audio signal is decided in this fashion, the decode program that mates with the current coding system is loaded onto the DSP 301a from the memory 303. Then, in the decode process 306a, the audio signal that is stored temporarily in the buffer 317 is decoded by the decode program. Then, the decoded audio signal is output from the decode process 306a to the output mute portion 307.

Here, if the audio signal is input newly into the apparatus in the middle of the main process 319, the interruption is applied to the main process 319 and thus the process that is carried out currently in the main process 319 is stopped temporarily. Then, the interrupt process 318 mentioned in advance is started instead of the main process 319. The process contents in the interrupt process 318 are similar to those explained above. When the interrupt process 318 is finished, the main process 319 that is halted temporarily is restarted once again.

In other words, in the fourth embodiment, the main process 319 and the interrupt process 318 are carried out in the DSP 301a according to a time-division system, and the interrupt process 318 is carried out every time when the audio signal is input into the apparatus. Accordingly, as explained in the first embodiment, since there is no necessity that the decode program should be loaded onto the DSP several times, the time needed to decide the coding system can be reduced shorter than the prior art.

It should be noted that, if the programmable CPU is employed in place of the DSP in the fourth embodiment, the same advantages as the fourth embodiment can be achieved.

(5) Explanation of an deciding apparatus for deciding audio signal coding system according to a fifth embodiment of the present invention.

Figure 7:
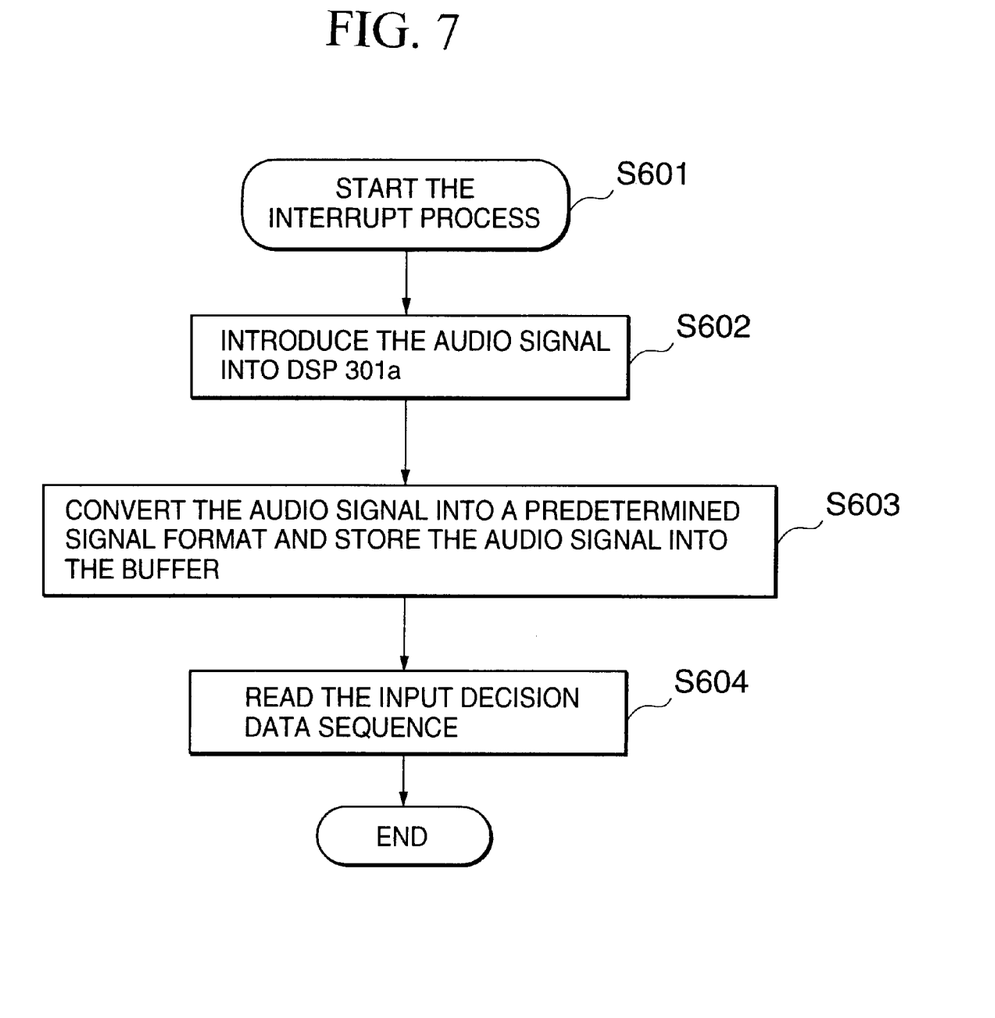
FIG. 7 is a flowchart showing procedures of an interrupt process in a deciding method for deciding audio signal coding system according to a fifth embodiment of the present invention.
Figure 8:
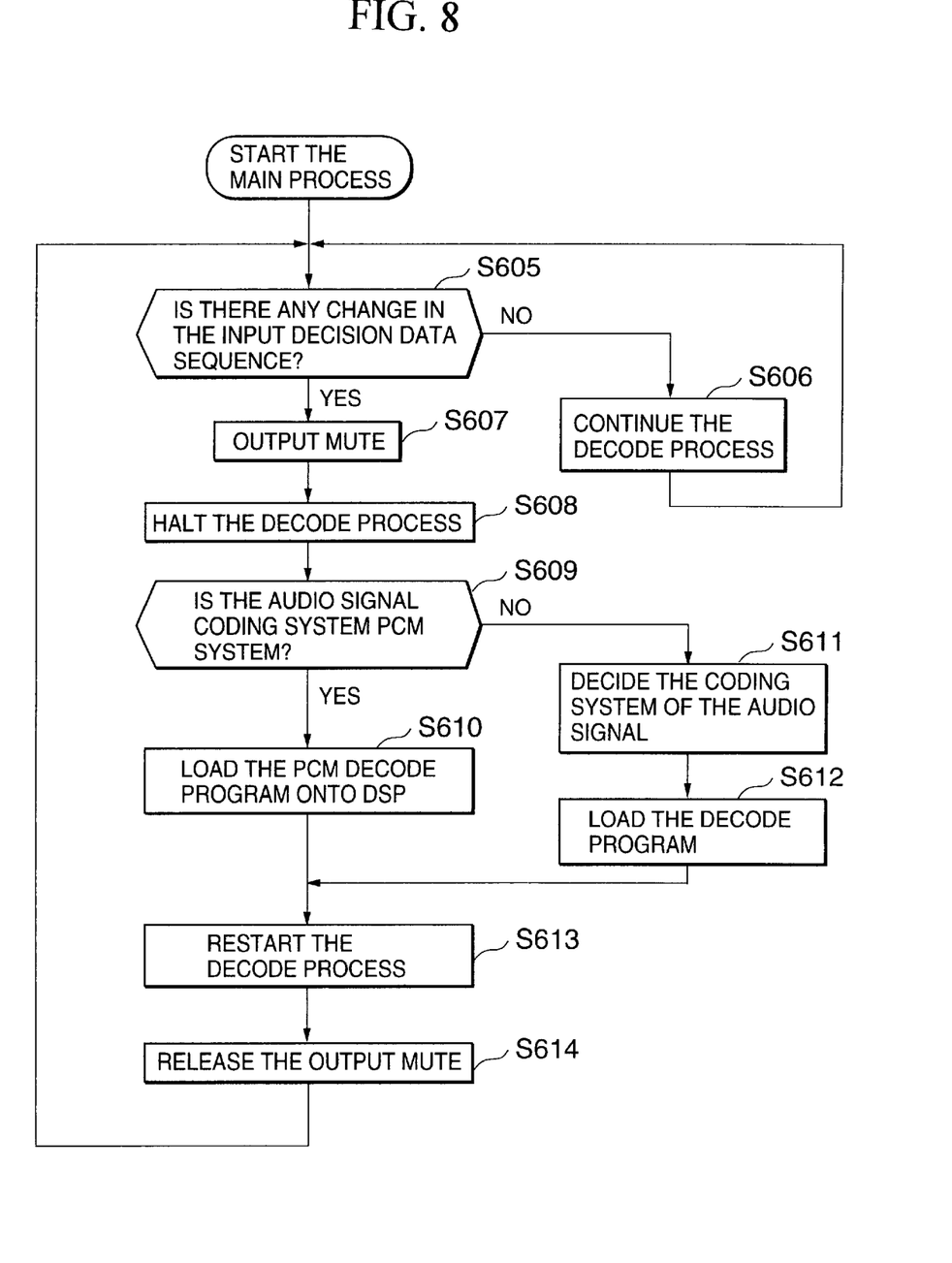
FIG. 8 is a flowchart showing procedures of a main process in the deciding method for deciding audio signal coding system according to the fifth embodiment of the present invention.

FIG. 7 and FIG. 8 are flowcharts of the deciding apparatus for deciding audio signal coding system according to the fifth embodiment. More specifically, FIG. 7 is a flowchart showing procedures of the interrupt process 318 in FIG. 6, and FIG. 8 is a flowchart showing procedures of the main process 319 in FIG. 6.

To begin with, the procedures in the interrupt process 318 will be explained with reference to FIG. 7.

First, when the audio signal is input into the apparatus, the process carried out now in the main process 319 is interrupted, and then the interrupt process shown in FIG. 7 is started in the interrupt process 318 (step S601).

Then, in step S602, the audio signal is introduced into the DSP 301a.

Then, in step S603, the audio signal introduced into the DSP 301a is converted into a predetermined signal format by the signal format convert process 302, and then the audio signal is stored into the buffer 317.

Then, in step S604, the input decision data sequence read process 304a reads the input decision data sequence in the audio signal being output from the signal format convert process 302. At the same time, the PCM flag is output from the signal format convert process 302.

With the above, the process in the interrupt process 318 is finished.

Next, the procedures in the main process 319 will be explained with reference to FIG. 8.

First, in step S605, it is checked whether or not there is any change in the input decision data sequence in the audio signal. This decision is executed in the input decision process 305a, and this is based on the input decision data sequence read in step S604 in the interrupt process.

If there is no change in the input decision data sequence in step S605 (if NO), the process goes to step S606 to continue the decode process of the audio signal which is being carried out currently in the decode process 306a.

If the input decision data sequence in the audio signal is changed in step S605 (if YES), the process goes to step S607. Then, the output mute signal is output to the output mute portion 307 from the input decision process 305a to mute the output.

Then, the process goes to step S608 to output the decode halt instruction to the decode process 306a from the input decision process 305a. Accordingly, the decode process of the audio signal which is being carried out currently in the decode process 306a is halted.

In turn, the process goes to step S609 to decide whether or not the coding system of the audio signal is either the PCM or the remaining (DTS, AC-3, or MPEG). This decision is made in the input decision process 305a based on the PCM flag which is output from the signal format convert process 302. That is, it is decided in the input decision process 305a that the audio signal is coded by the PCM if the PCM flag is ON, whereas it is decided that the audio signal is coded by the remaining (DTS, AC-3, or MPEG) other than the PCM if the PCM flag is OFF.

At this time, in step S609, if it is decided that the coding system of the audio signal that is being currently input into the apparatus is the PCM (if YES), the process goes to step S610. In step S610, the decode program for the PCM stored in the memory 303 is loaded onto the DSP 301a.

After this, the process goes to step S613 where the decode restart instruction is output to the decode process 306a from the input decision process 305a. Accordingly, in the decode process 306a, the decoding of the audio signal is restarted based on the newly loaded decode program for the PCM.

Then, the process goes to step S614 and then the output mute release signal is output to the output mute portion 307 from the input decision process 305a to release the mute of the output. Subsequently, above steps are repeated.

In step S609, if it is decided that the coding system of the audio signal that is being currently input into the apparatus is not the PCM (if NO), the process is shifted from step S609 to step S611. In step S611, in the input decision process 305a, the coding system of the audio signal is decided based on the input decision data sequence read by the input decision data sequence read process 304a. As discussed in the first and second embodiments, since the input decision data sequence is different according to the coding system (DTS, AC-3, and MPEG) respectively, the coding system of the current audio signal can be decided by previously investigating the input decision data sequences for each coding system (DTS, AC-3, and MPEG) in the designing step of the apparatus and then comparing the input decision data sequence with that of the current audio.

In step S611, if the coding system of the audio signal is decided, the process goes to step S612. In step S612, the decode program which corresponds to the decided coding system is loaded onto the DSP 301a from the memory 303. At this time, unlike the prior art, since the microcomputer is not employed in the present invention, it is as mentioned in the second embodiment that the time required for the loading can be reduced shorter than the prior art.

Then, the process goes to step S613 to restart the decode process. Then, the process goes to step S614 to release the mute of the output. After this, the above steps are repeated.

The interrupt process and the main process mentioned above are performed in the DSP 301a based on a time-division system. In other words, if the audio signal is input newly in the middle of the main process, the process in the main process is stopped temporarily and the interrupt process is started. Then, after the interrupt process has been finished, the process in the main process that is stopped temporarily is restarted. According to this, like the case explained in the first and second embodiments, since the necessity to load the decode program onto the DSP several times can be eliminated, the time consumed in the decision of the coding system can be reduced shorter than the prior art.

(6) Explanation of an deciding apparatus for deciding audio signal coding system according to a sixth embodiment of the present invention.

Figure 9:
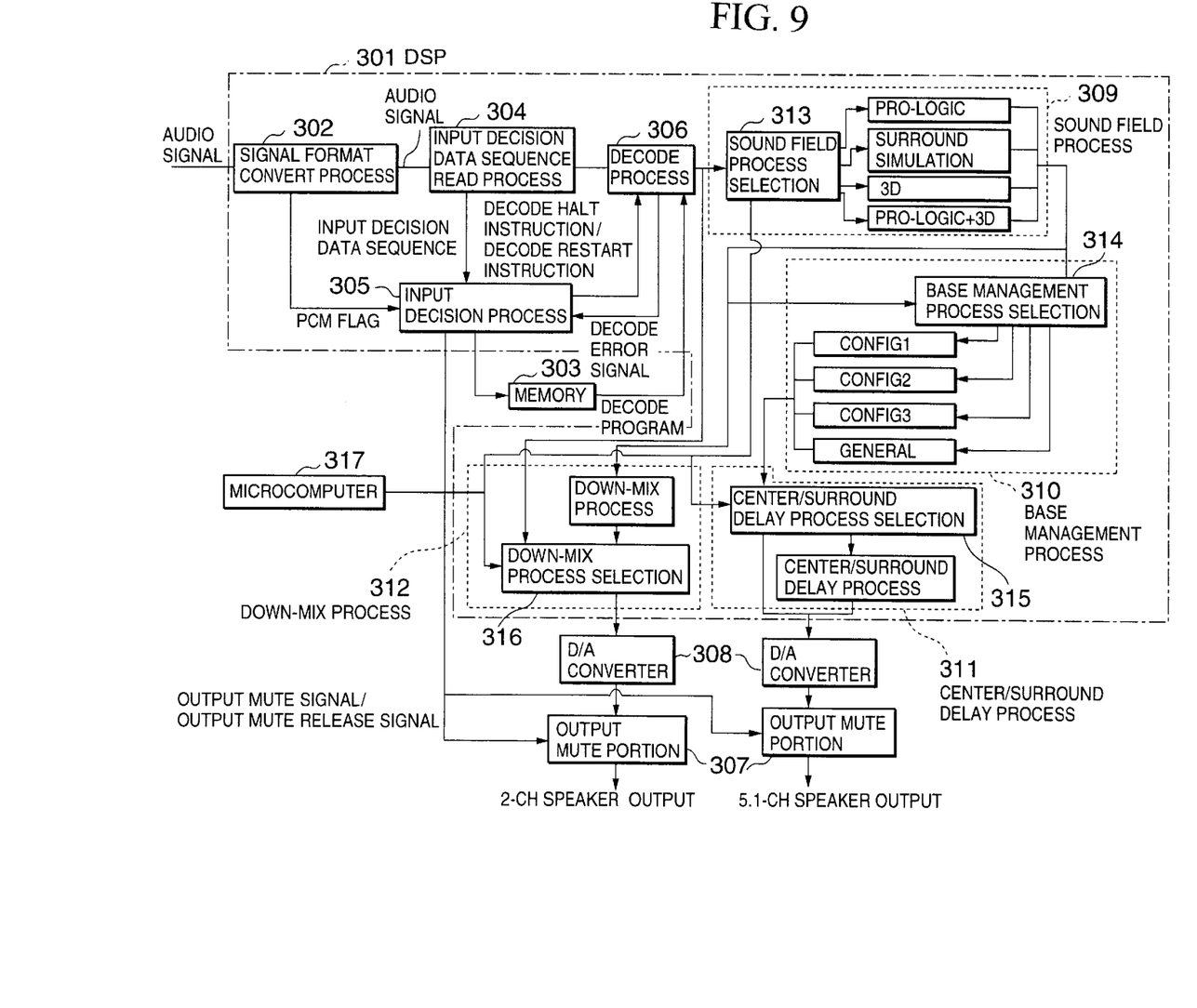
FIG. 9 is a block diagram showing a deciding apparatus for deciding audio signal coding system according to a sixth embodiment of the present invention.

FIG. 9 is a functional block diagram showing the deciding apparatus for deciding audio signal coding system according to the sixth embodiment of the present invention. In the deciding apparatus for deciding audio signal coding system according to the sixth embodiment, a sound field process 309, a base management process 310, a center/surround delay process 311, and a down-mix process 312 are interposed between the decode process 306 and the D/A converter 308 in the deciding apparatus for deciding audio signal coding system according to the first embodiment. In FIG. 9, the same numerals as in FIG. 3 are employed and their explanation will be omitted in the following.

In FIG. 9, the sound field process 309 applies any one process of Pro-logic, Surround simulation, 3D, and Pro-logic+3D selectively to the audio signal output from the decode process 306 according to the user's request.

The base management process 310 adjusts the sound field in the low sound range according to the user's request.

The center/surround delay process 311 enables the user to listen the desired stereo sound field by applying a predetermined process to the audio signal even if a distance between the user who listens the music and the speaker is changed.

The down-mix process 312 converts the 5.1-ch audio signal output from the sound field process 309 into the 2-ch audio signal for the headphone.

Then, the user selects these processes by using a remote control or a panel controller (not shown) according to the user's own request. A microcomputer 317 controls the remote control or the panel controller. If the user selects his or her desired process, the microcomputer 317 outputs predetermined instructions to a sound field process selection 313, a base management process selection 314, a center/surround delay process selection 315, and a down-mix process selection 316 respectively. Accordingly, the user's desired processes are applied to the audio signal and thus the user can listen his or her desired sound field.

In the sixth embodiment, the microcomputer 317 controls the display, the remote controller, and the control panel (not shown), and is not configured to decide the coding system of the audio signal as in the prior art. Therefore, even when the coding system of the audio signal is changed, there is no case where the jobs of the microcomputer (control of the display, the remote controller, the control panel, etc.) are held as in the prior art.

In addition, the input decision process 305 in the sixth embodiment is processed by the deciding method for deciding audio signal coding system according to the second or third embodiment. Accordingly, in the sixth embodiment, it is as explained in the second or third embodiment that the time necessary for the decision of the coding system of the audio signal can also be reduced shorter than the prior art.

What is claimed is:

1. A deciding apparatus for deciding an audio signal coding system comprising:

a digital signal processor for receiving a coded audio signal, deciding a coding system of the coded audio signal based on data sequence in a predetermined portion of additional data of the audio signal, and decoding the audio signal to output it;

a storing means for storing decode programs to decode the coded audio signal; and a decode process unit for outputting a decode error signal if the coding system of the audio signal which is converted into the predetermined signal format does not correspond to the decode program.

2. The deciding apparatus for deciding an audio signal coding system according to claim 1, further comprising:

an output muting means for selectively outputting the decoded audio signal based on an output mute signal.

3. The deciding apparatus for deciding an audio signal coding system according to claim 2, wherein the digital signal processor executes, (a) signal format convert process for outputting a PCM flag indicating whether or not the audio signal is coded by a PCM coding system based on additional data in the audio signal, and converting the audio signal into a predetermined signal format to output, (b) input decision data sequence read process for receiving the audio signal which is converted into the predetermined signal format by the signal format convert process, outputting data sequence by reading the data sequence in a predetermined portion of the additional data in the audio signal which is converted into the predetermined signal format, and outputting the audio signal which is converted into the predetermined signal format, (c) decode process for receiving the audio signal which is converted into the predetermined signal format from the input decision data sequence read process, decoding the audio signal which is converted into the predetermined signal format by the decode program, and (d) input decision process for receiving the PCM flag from the signal format convert process, receiving the data sequence from the input decision data sequence read process, receiving the decode error signal from the decode process, outputting the output mute signal to the output muting means and also outputting a decode halt instruction to the decode process if the decode error signal is received, deciding the coding system of the audio signal which is converted into the predetermined signal format based on the PCM flag and the data sequence after the decode halt instruction is output, loading a decode program which corresponds to the coding system decided by the decision from the storing means after the decision is finished, and outputting a decode restart instruction to the decode process and outputting an output mute release signal to the output mute portion after loading is finished.

4. The deciding apparatus for deciding an audio signal coding system according to claim 2, wherein the digital signal processor executes;

(a) a interrupt process which comprises, (i) signal format convert process for outputting a PCM flag indicating whether or not the audio signal is coded by a PCM coding system based on additional data in the audio signal, and converting the audio signal into a predetermined signal format to output, (ii) input decision data sequence read process for receiving the audio signal which is converted into the predetermined signal format by the signal format convert process, outputting data sequence by reading the data sequence in a predetermined portion of the additional data in the audio signal which is converted into the predetermined signal format, and outputting the audio signal which is converted into the predetermined signal format, and (iii) processes for inputting the audio signal which is converted into the predetermined signal format into a buffer from the signal format convert process, and storing temporarily the audio signal which is converted into the predetermined signal format; and (b) main process which comprises, (i) decode process for receiving the audio signal which is converted into the predetermined signal format from the buffer in the interrupt process, and decoding the audio signal which is converted into the predetermined signal format by the decode program to output, and (ii) input decision process for receiving the PCM flag from the signal format convert process in the interrupt process, receiving the data sequence from the input decision data sequence read process in the interrupt process, deciding whether or not there is any change in the coding system of the audio signal which is converted into the predetermined signal format based on the PCM flag and the data sequence, outputting the output mute signal to the output muting means and also outputting a decode halt instruction to the decode process if it is decided by the decision that there is change in the coding system of the audio signal, deciding the coding system of the audio signal which is converted into the predetermined signal format based on the PCM flag and the data sequence, loading a decode program which corresponds to the coding system decided by the decision from the storing means after the decision is finished, and outputting a decode restart instruction to the decode process and outputting an output mute release signal to the output muting means after loading is finished, wherein interruption is applied to the main process by executing the interrupt process every time when the coded audio signal is input into the digital signal processor, and the main process and the interrupt process are carried out according to a time-division system.

5. The deciding apparatus for deciding an audio signal coding system according to claim 1, wherein the digital signal processor deciding step comprises a comparing step.

6. The deciding apparatus for deciding an audio signal coding system according to claim 5, wherein the comparing step comprises the steps of:

comparing the predetermined portion of additional data of the audio signal with a know data type; and decoding the audio signal based upon the comparison between the predetermined portion of additional data and the known data type.

7. The deciding apparatus for deciding an audio signal coding system according to claim 6, wherein said known data type is input decision data chosen from a plurality of different input decision data types.

8. A deciding method for deciding an audio signal coding system comprising the steps of:

deciding a coding system of the audio signal based on data sequence in a predetermined portion of additional data in a coded audio signal, wherein said deciding step compares the predetermined portion of additional data with a known data type; and outputting a decode error signal if the decided coding system does not correspond to the audio signal coding system.

9. The deciding method for deciding an audio signal coding system according to claim 8, wherein said known data type is input decision data chosen from a plurality of different input decision data types.

10. A deciding method for deciding an audio signal coding system comprising the steps of:

detecting that a coding system of a coded audio signal is changed;

deciding whether or not the coded audio signal is coded by a PCM coding system;

deciding whether or not decoding process of the coded audio signal in a predetermined range is finished if it is decided that the coded audio signal is not coded by the PCM coding system, and repeating the decision if it is decided that the decoding process in the predetermined range is not finished;

halting the decode process if it is decided by the decision that the decoding process in the predetermined range is finished;

deciding a coding system of the coded audio signal based on data sequence in a predetermined portion of additional data in the coded audio signal after the decode process is halted;

loading a decode program which corresponds to the coding system decided by the decision after the coding system of the coded audio signal is decided; and restarting decode process of the coded audio signal after loading is finished.

11. The deciding method for deciding an audio signal coding system according to claim 10, wherein the step of detecting that the coding system of the coded audio signal is changed includes the step of muting an output from the decode process after detection, and the step of restarting the decode process of the coded audio signal includes the step of releasing the mute after restart.

12. The deciding method for deciding an audio signal coding system according to claim 10 or claim 11, wherein the predetermined range of the coded audio signal is one frame of the audio signal.

13. The deciding method for deciding an audio signal coding system according to claim 10 or claim 11, wherein the predetermined range of the coded audio signal is one sample of the audio signal.

14. A deciding method for deciding an audio signal coding system comprising:

interrupt process including the step of storing temporarily a coded audio signal into a buffer and the step of reading data sequence in a predetermined portion of additional data in the coded audio signal and outputting a PCM flag indicating whether or not the coded audio signal is coded by a PCM coding system; and main process including the step of deciding whether or not a coding system of the audio signal is changed based on the data sequence and the PCM flag, the step of deciding whether or not the audio signal is coded by the PCM coding system if it is decided by decision that the coding system of the audio signal is changed, the step of deciding the coding system of the coded audio signal based on the data sequence if it is decided that the audio signal is not coded by the PCM coding system, and the step of loading a decode program which corresponds to the coding system decided by the decision after the coding system of the coded audio signal is decided;

wherein interruption is applied to the main process by executing the interrupt process every time when the coded audio signal is input, and the main process and the interrupt process are carried out according to a time-division system.

* * * * *

UNITED STATES PATENT AND TRADEMARK OFFICE
CERTIFICATE OF CORRECTION

PATENT NO. : 6,456,966 B1
DATED : September 24, 2002
INVENTOR(S) : Hiroshi Iwabuchi It is certified that error appears in the above-identified patent and that said Letters Patent is hereby corrected as shown below:

<u>Title page,</u>
Item [54], please change the Title of the invention to read follows:
-- APPARATUS AND METHOD FOR DECODING AUDIO SIGNAL CODING IN A DSP SYSTEM HAVING A MEMORY --

Signed and Sealed this

Eleventh Day of November, 2003

JAMES E. ROGAN
*Director of the United States Patent and Trademark Office*